United States Patent
Richard et al.

(10) Patent No.: US 6,320,706 B1
(45) Date of Patent: Nov. 20, 2001

(54) METHOD AND APPARATUS FOR POSITIONING AND FIXATING AN OPTICAL ELEMENT

(75) Inventors: Derek J. Richard, Tracy; Mark Byer, Mountain View; Gerald Mitchell, Los Altos; George Conway, San Mateo, all of CA (US)

(73) Assignee: Lightwave Electronics, Mountain View, CA (US)

( * ) Notice: Subject to any disclaimer, the term of this patent is extended or adjusted under 35 U.S.C. 154(b) by 0 days.

(21) Appl. No.: 09/512,418

(22) Filed: Feb. 24, 2000

(51) Int. Cl.⁷ .............................. G02B 7/02; G02B 7/182
(52) U.S. Cl. ........................ 359/822; 359/819; 359/872
(58) Field of Search .................... 359/819, 822, 359/871, 872, 873, 874, 875–882

(56) References Cited

U.S. PATENT DOCUMENTS

| | | | |
|---|---|---|---|
| 3,966,309 | 6/1976 | Mohler | 350/310 |
| 4,466,102 | 8/1984 | Woste | 372/53 |
| 4,672,202 * | 6/1987 | Crossley, Jr. et al. | 250/238 |
| 4,761,788 | 8/1988 | Dietrich et al. | 372/36 |
| 4,787,696 | 11/1988 | Norris et al. | 350/96.2 |
| 4,827,485 | 5/1989 | Scerbak et al. | 372/107 |
| 4,937,660 | 6/1990 | Dietrich et al. | 357/80 |
| 5,170,409 | 12/1992 | Nightingale et al. | 372/107 |
| 5,220,460 * | 6/1993 | Bedzyk | 359/813 |
| 5,247,843 * | 9/1993 | Bryan | 73/865.6 |
| 5,291,336 | 3/1994 | Miles | 359/808 |
| 5,381,263 * | 1/1995 | Nowak et al. | 359/411 |
| 5,461,515 * | 10/1995 | Sorce | 359/872 |
| 5,872,367 | 2/1999 | Wolber et al. | 250/522.1 |
| 5,973,842 | 10/1999 | Spagenberg | 359/619 |
| 5,986,827 * | 11/1999 | Hale | 359/822 |

* cited by examiner

*Primary Examiner*—Ricky Mack
(74) *Attorney, Agent, or Firm*—Lumen Intellectual Property Services, Inc.

(57) ABSTRACT

Optical, opto-mechanical and electro-optical elements (OE) of a Laser resonance assembly (LRA) are positioned and fixated in close proximity on an assembly plate by clamping the OE in a vacuum chuck that holds the OE on a clamping portion on the very top of it. The OE is brought into the predetermined position while a lateral attaching surface of the OE is kept in a predetermined angle relative to the assembly plate. A side mount is placed between the mirror and the assembly plate after an UV-curing adhesive has been applied. The attaching surface s and the adhesive have a specific relation between areal extension, surface roughness, uncured viscosity and uncured cohesive force.

35 Claims, 7 Drawing Sheets

METHOD AND APPARATUS FOR POSITIONING AND FIXATING AN OPTICAL ELEMENT

FIELD OF THE INVENTION

The invention relates in general to positioning mounts for optical, opto-mechanical and electro-optical components, and in particular to positioning mounts that are adhesively fixated.

BACKGROUND OF THE INVENTION

Optical assemblies or components, for instance laser assemblies and optical cavities feature a number of components that need to be precisely aligned relative to each other.

A typical optical assembly consists mainly of a planar assembly platform on which a number of devices are positioned relative to each other. The devices are attached to pedestals that provide varying degrees of freedom in the positioning.

U.S. Pat. No. 4,466,102 describes a modular dye laser. The pedestals introduced in this patent are mainly stacked plates that can slide along the planar top surface of a modular assembly platform. No specific method is provided to fixate the pedestals in the defined test position.

U.S. Pat. No. 4,827,485 describes a diode pumped solid state laser that is placed on a pedestal including an adjustment mechanism of essentially two wobble plates that can be rotated against each other. The pedestal provides a limited vertical adjustment without any fixating feature.

To fixate optical assemblies or components in their designated position the pedestals are typically soldered onto the assembly platform. The soldering process places an unfavorable thermal load on the assembly. Soldering of the pedestals themselves is also hard to accomplish without disturbing the overall configuration. The overall configuration is defined by a number of individual mounts positioned in a friction resistant manner relative to each other.

UV-curing adhesives have been utilized to circumvent the problems associated with the soldering technique. Pedestals or mounts are at least partially made of translucent material such that a curing UV-light can be directed onto the adhesive film between the individual mounts.

U.S. Pat. No. 5,170,409 describes a laser resonator assembly that utilizes a translucent assembly platform on which the individual components of the laser resonator assembly are positioned. The individual components are adhesively attached to blocks, which are also translucent. The invention provides a simple method to position and fixate the individual components. The mounting method does not provide enough degrees of freedom that are necessary for a precise fixation in position and orientation of the individual optical components within the laser resonator assembly. Further, the beam has to travel through the adhesive junction and the mount. As a result, both the adhesive junction and the mount have to fulfill optical requirements, which limits there optimization regarding mechanical and thermal behavior.

Another shortcoming is that the adhesive has a relatively high resilience, which causes, in combination with a thick film application of the adhesive, that the blocks creep back towards the position prior to the positioning adjustment. Another shortcoming is that the shape defined adhesive fixation described in the patent does not provide a possibility to adjust the optical axes of the elements with respect to the optical plane of the laser resonator assembly. As a result, the glue gap is more or less wedge-like shaped, which eventually results in misalignment during the curing process and long term instability.

A further shortcoming is that adhesive junction of the optical elements is in the beam path of the laser. Hence, the attaching surfaces have to fulfill primarily optical properties, which do not allow them to be roughened. Yet, roughening an attaching surface enhances its wetting characteristic and allows a reliable thin film adhesive attachment. In addition, a wedge shaped cured adhesive eventually imposes an optical distortion to the beam.

Finally, a shortcoming of the patent is that the thermal loads imposed onto the optical elements result in a thermal expansion of the mount. The thermal loads result for instance from optical absorption of the adhesive and the mounting material through which the light travels. The thermal expansion changes the orientation of the optical axes of the optical elements.

Therefore, there exists a need for a simple and economical method and apparatus to position and fixate an optical element without the limitations described in the paragraphs above.

OBJECTS AND ADVANTAGES

It is a primary object of the present invention to provide a method and apparatus to precisely adjust and fixate an optical element.

It is a further object of the present invention to provide an optical element and a side mount in relational shapes that allow free positioning and orienting with five degrees of freedom.

It is a further object of the present invention to provide a method and apparatus to fixate an optical element with a radiation curing adhesive in a way such that a guided laser is not effected by the adhesive junction.

It is a further object of the present invention to provide a method and apparatus to fixate an optical element with thin film adhesive junctions.

It is a further object of the present invention to provide an angular adjustment possibility for the optical axis of an optical element relative to the optical plane of a laser resonator assembly.

It is a further object of the present invention to provide a method to fixate an optical element such that thermal expansion does not change the orientation of the optical axis of the optical element.

Finally, it is an object of the present invention to provide a mounting system for thermal isolation and/or bi-directional thermal control.

SUMMARY

The invention introduces a method to position and adhesively fixate an optical element with a minimal space requirement that is simple, fault tolerant and lasting. A system of a specifically shaped optical element and a specifically shaped side mount is introduced. The optical element can be any active or passive element e.g. a mirror. Both the mirror and the side mount have additional features that are necessary and/or assist in the positioning and fixating.

The preferred application of the present invention is for fabricating laser resonator assemblies (LRA). Never the less the present invention may be also applied too any optical systems, microwave and RF systems, fiber optic systems, telescopes, binoculars, satellite systems. In a LRA, a laser beam is typically guided by a number of optical elements that are positioned and fixated on an assembly plate. The precision, with which the optical elements are positioned and oriented determines among other influences the quality and efficiency of the LRA. To maximize the precision of an LRA the optical elements are mounted such that dimensional distortion because of thermal expansion of the main assembly plate remains low.

The assembly plate holds mainly a number of optical elements as for instance mirrors, lenses, prisms, optical filters, wave plates, linear crystals, non linear crystals, optical diodes, sensors, pinholes, beam dumps, gain media, modulators, passive filters, active filters, polarizers, shutters, reticles, diode lenses, diode lasers and any combination of the above. Optical elements may be optical, opto-mechanical and electro-optical components as known to those skilled in the art. All parts of a LRA must maintain their position over several thousand operational hours.

The assembly plate has a top surface, which is utilized as an attaching surface. To position and fixate optical elements, the invention introduces an aligning chuck that is connected to a conventional aligning gauge. The aligning chuck has a clamping feature that corresponds with two or more clamping surfaces with a distinct clamping portion of the mirror. The aligning chuck is preferably a vacuum chuck, which evacuates a portion of at least one clamping surface. Consequently, the mirror is pressed by the air pressure against that particular clamping surface and the friction between that clamping surface and the mirror establishes a rigid attachment between them.

The use of the vacuum chuck allows a simple attachment of small-scale optical elements in general. In case a mirror needs to be positioned, the vacuum chuck is favorable because it helps avoid damage to the coated mirror side. A further advantage is the minimal space requirements for a reliable interlocking between the optical element and/or mirror and the vacuum chuck. This fact allows to position and fixate the LRA elements in closest proximity and helps to keep the over all size of the LRA to a minimum.

After a LRA element has been clamped to the vacuum chuck the LRA element is brought into a predetermined position and orientation while a first attaching surface of the LRA element is kept at a predetermined angle relative to the top surface of the assembly plate. After cleaning and degreasing the first attaching surface and the designated fixating area on the top surface an adhesive is applied on both of them. For the purpose of clarity the fixating area of the top surface is called the "fourth attaching surface" in the following.

In a following step a side mount with a second and third attaching surface is brought into contact with the first attaching surface and the fourth attaching surface. Second and third attaching surfaces have essentially the same angle as maintained between the first attaching surface and the fourth attaching surface during the positioning process. First and second attaching surfaces form a first adhesive junction and the third attaching surface forms together with the fourth attaching surface the second adhesive junction.

The used adhesives have uncured viscosities and uncured cohesive characteristics such that the second and third attaching surfaces are drawn into a snug contact with the first and fourth attaching surfaces. Through axial back and forth movement imposed by the aligning gauge onto the optical element the cohesive forces of the uncured adhesives are supported to overcome the adhesives' uncured viscosities and to work the adhesives out of the gaps of the adhesive junctions. To make this possible, the first adhesive junction defines with its first size and its first adhesive having a first uncured cohesive characteristic a first working factor. The second adhesive junction defines with its second size and its second adhesive having a second viscosity a second working factor. First and second working factors relate to each other such that back and forth movements perpendicular to the first junction allow a sliding movement between the third attaching surface and the top surface of the assembly plate without disconnecting the uncured adhesive bond between first and second attaching surface. The same applies to the other adhesive bond.

The first attaching surface of the optical element is lateral to the optical axis of the optical element such that the laser beam does not have to pass through it. Hence, the first and second attaching surfaces as well as the third and fourth attaching surfaces do not need to meet optical requirements and can be roughened. The roughening provides for a good wetting characteristics of the attaching surfaces and assures a required amount of remaining adhesive between the snugly fitting attaching surfaces. As a result, the side mount establishes a rigid and direct contact to the optical element and the assembly plate. The minimal presence of adhesive evenly distributed between the attaching surfaces assures a maximal stiffness and position consistency of the LRA element over an extended time period.

The adhesive that is worked out of the gaps during the contacting of the attaching surfaces builds sealing rings around the adhesive junctions. The sealing rings help to prevent moisture from creeping into the adhesive junction, which eventually alters unfavorably the mechanical properties of the adhesives over time.

Furthermore, the direct contacting of the side mount with the LRA element and the assembly plate improves the thermal conductivity such that for a given areal extension of available attaching surfaces and a given material for the LRA element and the side mount a maximal thermal load can be imposed by the laser onto the LRA element.

All attaching surfaces are essentially planar. Due to the high degree of freedom in the positioning of the optical element in accordance with the invention the manufacturing tolerances of the optical element are mainly limited by the optical demands. The manufacturing tolerances for the side mount are limited by the angular precision The optical device of claim 3, wherein said first attaching surface is parallel to said optical axis between third and fourth attaching surface. To avoid an unintentionally wrong assembly of the side mount a reference mark is added on the side mount. The reference mark is preferably a chamfer on the diagonal opposing the intersection edge between second and third attaching surface.

The adhesive utilized in the invention is preferably a UV-curing adhesive. The UV-curing adhesive allows an extended time period to apply and work the adhesive junctions, which allows the fabrication worker to perform the positioning more carefully and accurately. Further more, the beginning and duration of the curing process is controllable. Both facts reduce the fabrication time of LRA and increase their optical, mechanical and thermal reliability.

A thermal load that is imposed by a guided laser over the thickness of the optical element is therefore evenly drained and the thermal expansion leaves the orientation of the optical axis of the optical element unaltered. As a result, the performance of a LRA utilizing the inventive positioning and fixating method is highly stable against thermal influences.

The side mount is made of a material that corresponds with its thermal conductivity to the thermal load that has to be transmitted towards and/or away from the optical element in order to keep the optical element within a predetermined temperature range.

DETAILED DESCRIPTION

The optical element described as an example in this application is a mirror 8. An optical element may as well be for instance a lense, a prism, an optical filter, a wave plate, a linear crystal, a non linear crystal, an optical diode, a sensor, a pinhole, a beam dump, a gain medium, a modulator, a passive filter, an active filter, a polarizer, a shutters, a reticles, a diode lenses, a diode lasers and any combination of the above. An Optical element may be an optical, an opto-mechanical and/or an electro-optical component as known to those skilled in the art.

As an example of an application of the present invention is described a laser resonance assembly (LRA). The present invention may as well be applied to any optical system, microwave and RF systems, fiber optic system, functional parts of telescopes, binoculars and/or satellite systems.

Figure 1:
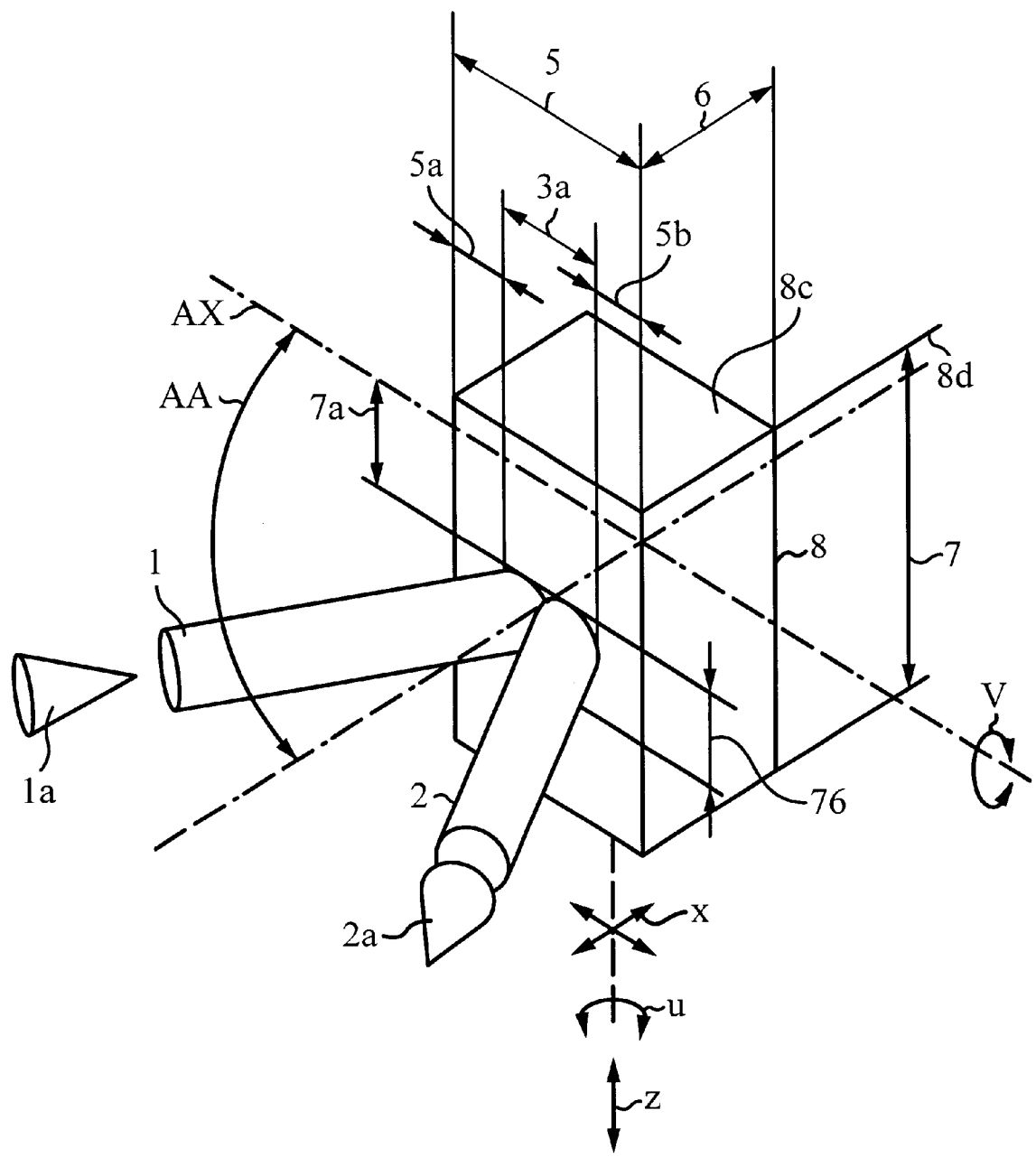
FIG. 1 shows an exemplary perspective view of a mirror and a reflected laser beam.

FIG. 1 shows an example of a mirror 8 as it is used within a laser resonance assembly (LRA). The mirror 8 has a mirror front face 8a, a mirror attachment face 8b, a top face 8c and an optical axis 8d. A laser 1 enters the translucent structure of the mirror 8 at the mirror front face 8a in the direction of the first direction arrow 1a. The laser beam is reflected on the coated mirror back face (not visible), which is opposite the mirror front face 8a. After the reflection, the reflected laser 2 emits again from the mirror front face 8a and continues to travel in direction of the second direction arrow 2a. The laser 1 and the reflected laser 2 occupy a penetration area on the mirror front face 8a that is characterized by the laser penetration width 3a and the laser penetration height 3b.

A conventional LRA consists of a number of optical elements like for instance the mirror 8, which have to be brought into precise position and orientation with respect to each other in order to make the LRA work. Hence, as shown in FIG. 1 the mirror 8 has to be positioned in x-direction X and y-direction Y. Furthermore, the mirror 8 has to be oriented around its vertical axis as shown with the first orientation indicator U.

In a typically LRA, the laser is transmitted between the individual optical elements within an optical plane represented by optical plane symbol 9. The parallelism between the optical axis 8d and the optical plane must be within a given tolerance to assure that the laser remains within a predetermined maximal proximity to the optical plane. It is noted, that a LRA may have more than a single optical plane. In that case, the axis 8d is at a given tolerance to a specific optic plane relevant for the mirror 8.

The present invention introduces an orientation adjustment around an adjustment axis AX to allow an adjustment of the optical axis 8d relative to the optical plane. As a result, the achievable precision in the alignment of the optical axis 8d is essentially independent from fabrication tolerances of the mirror 8 and other building elements of the LRA.

The adjustment axis AX has an angle AA relative to the optical axis 8d such that a tilting of the mirror 8 visualized by the second rotation indicator V around the adjustment axis AX results in an angular movement of the optical axis 8d relative to the optical plane. In the preferred embodiment, the angle AA is essentially 90 degrees.

The mirror 8 is defined by mirror width 5, mirror thickness 6 and mirror height 7. The mirror width 5 is the sum of the laser penetration width 3 and the first and second horizontal margin 4a and 4b. The mirror height 7 is the sum of the laser penetration height 3b and the upper and lower vertical margin 7a and 7b.

Figure 2:
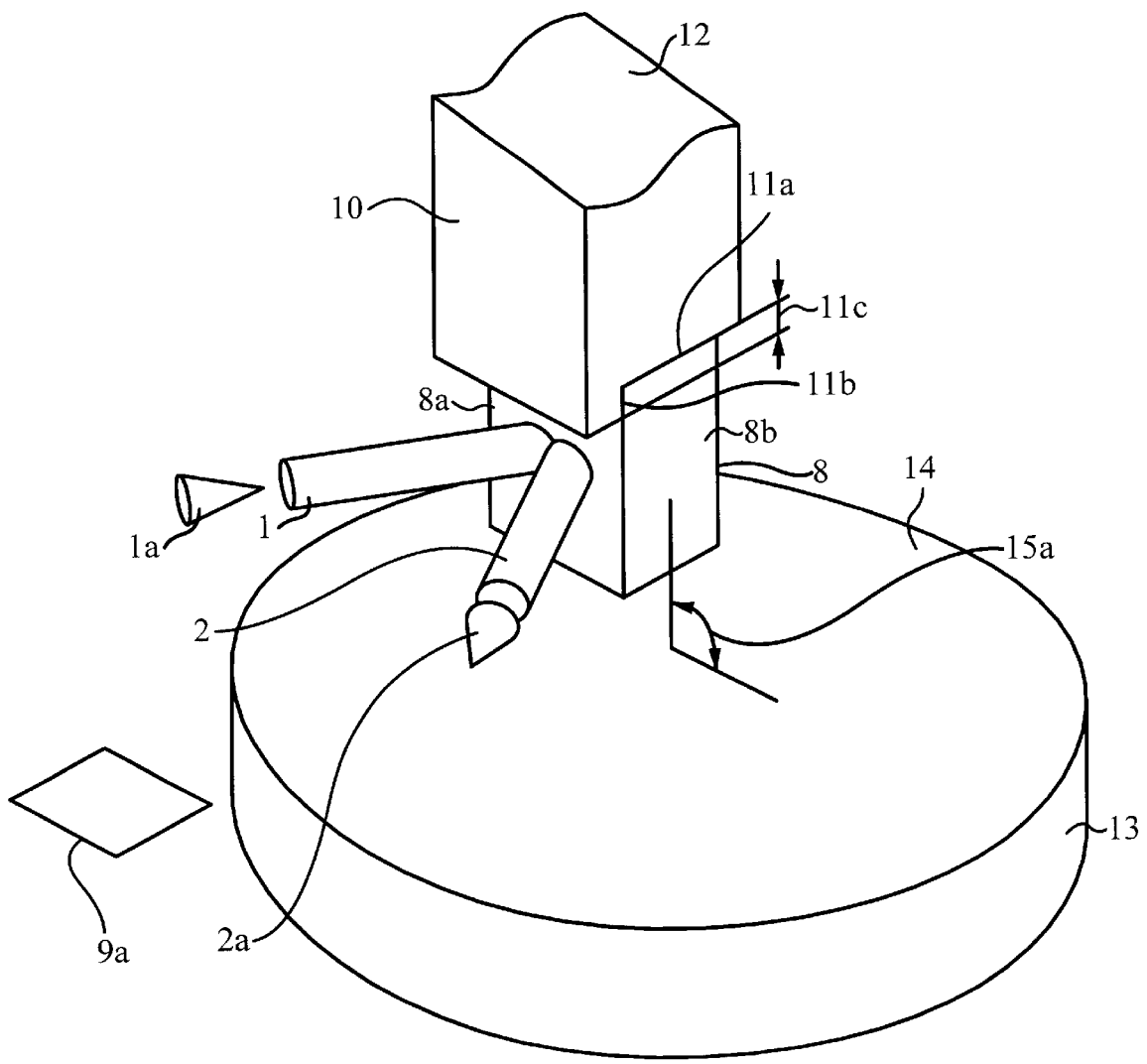
FIG. 2 shows an exemplary perspective view of the mirror clamped in an adjustment chuck and a sectional portion of the assembly plate.

FIG. 2 shows the preferred embodiment, in which the mirror 8 is being clamped on a vacuum chuck 10 during its alignment and fixation. The vacuum chuck 10 is shown in fragmental view up to the breaking surface 12. The vacuum chuck 10 is connected to a conventional alignment gauge (not shown) that provides the possibility for adjustments as described under FIG. 1. The vacuum chuck 10 has an exemplary clamping shape on its lower end, which consists of a protrusion of a horizontal contour line 11a and a vertical contour line 11b. The horizontal contour line 11a and the vertical contour line 11b form a first angle that corresponds to the second angle between the mirror top face 8c and the mirror front face 8a. The clamping shape overlaps the mirror front face 8a with the clamping overlap 11c.

The vacuum chuck 10 provides an evacuation feature on its clamping shape that is able to built up a vacuum between the vacuum chuck and the mirror 8 once they are brought into areal contact with each other. The evacuation feature is a hole or a porous section that accesses the gap between the clamping shape and the clamping portion of the mirror 8. The evacuation feature is connected to a peripheral vacuum pump (not shown). At the beginning of the aligning process the mirror 8 is brought with mirror front face 8a and mirror top face 8c into snug contact with the clamping shape. The smoothness and the precision of the mirror front face 8a is typically higher than that of all other faces. The mirror front face 8a defines the optical axis 8d and is preferably utilized as a reference face during the aligning process.

To assemble a number of optical elements in closest proximity to each other within the LRA, the vacuum chuck 10 clamps the mirror 8 mainly from a direction essentially perpendicular to the optical plane. The adjustment process is performed either by bringing the vacuum chuck 10 and consequently the mirror 8 into a predetermined position and/or orientation, or in an experimental way by applying a reference beam onto the mirror front face 8a.

It is appreciated, that the clamping shape may be of any form, partially or in whole corresponding at least to a fragment of the mirror 8. It is further noted, that any other device or method to hold the mirror 8 during an alignment and fixating process may be used without diverting from the scope of the present invention.

FIG. 2 further shows a sectional portion of an assembly plate 13 with its top surface 14. The top surface 14 is typically parallel to the optical plane and is the main assembly platform of the LRA. During the adjustment process of the mirror 8, an alignment fix angle 15a is maintained between the mirror attachment face 8b and the top surface 14.

Figure 3:
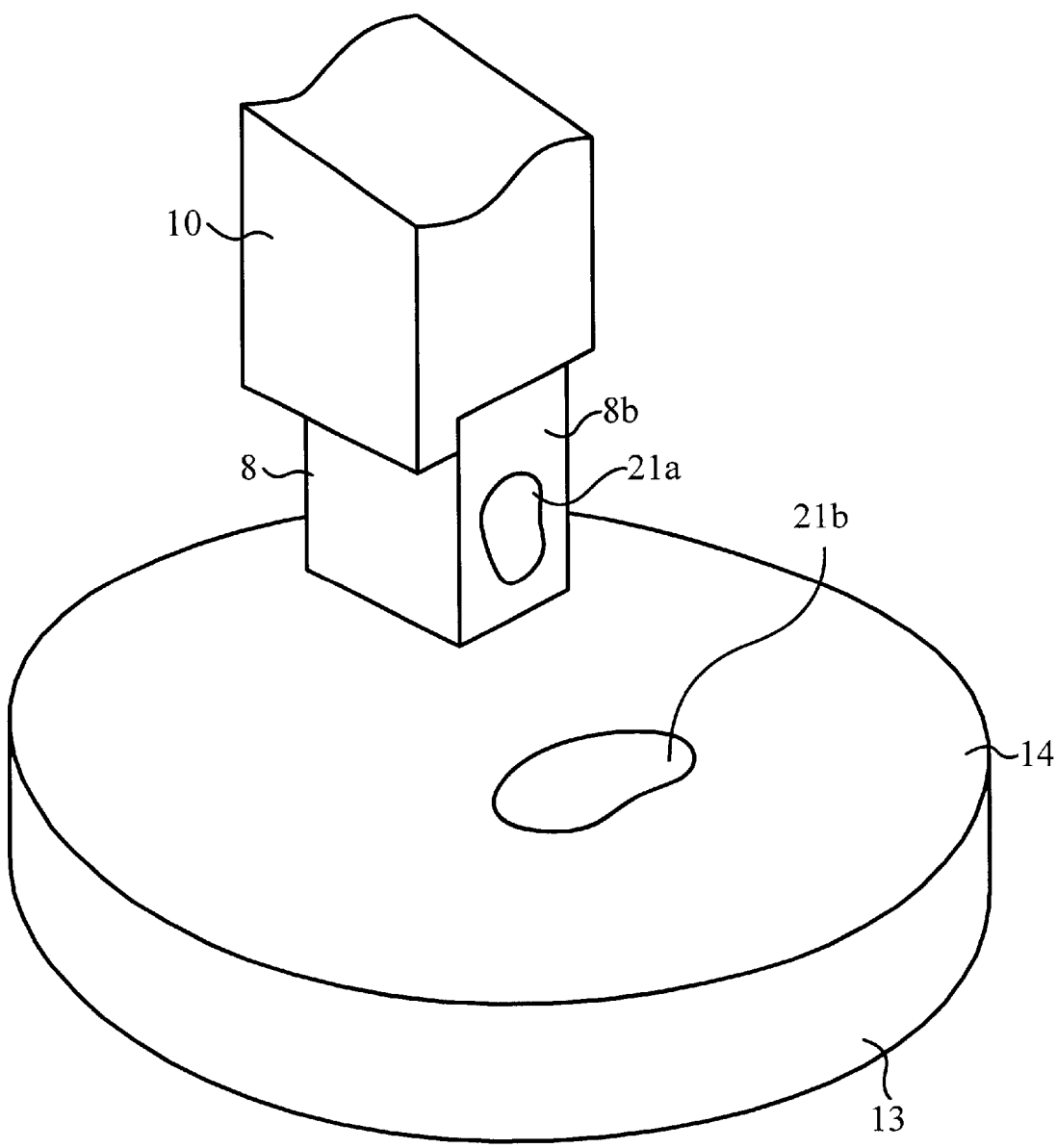
FIG. 3 shows an exemplary perspective view of the mirror and the sectional portion of the assembly plate, both with applied adhesive.

FIG. 3 shows the second proceeding step that follows the adjustment process. The second proceeding step includes the application of a first adhesive 21a on a first attaching surface, which is a portion of the mirror attachment face 8b. The second proceeding step further includes the application of a second adhesive 21b on a fourth attaching surface, which is a portion of the top surface 14.

Figure 6:
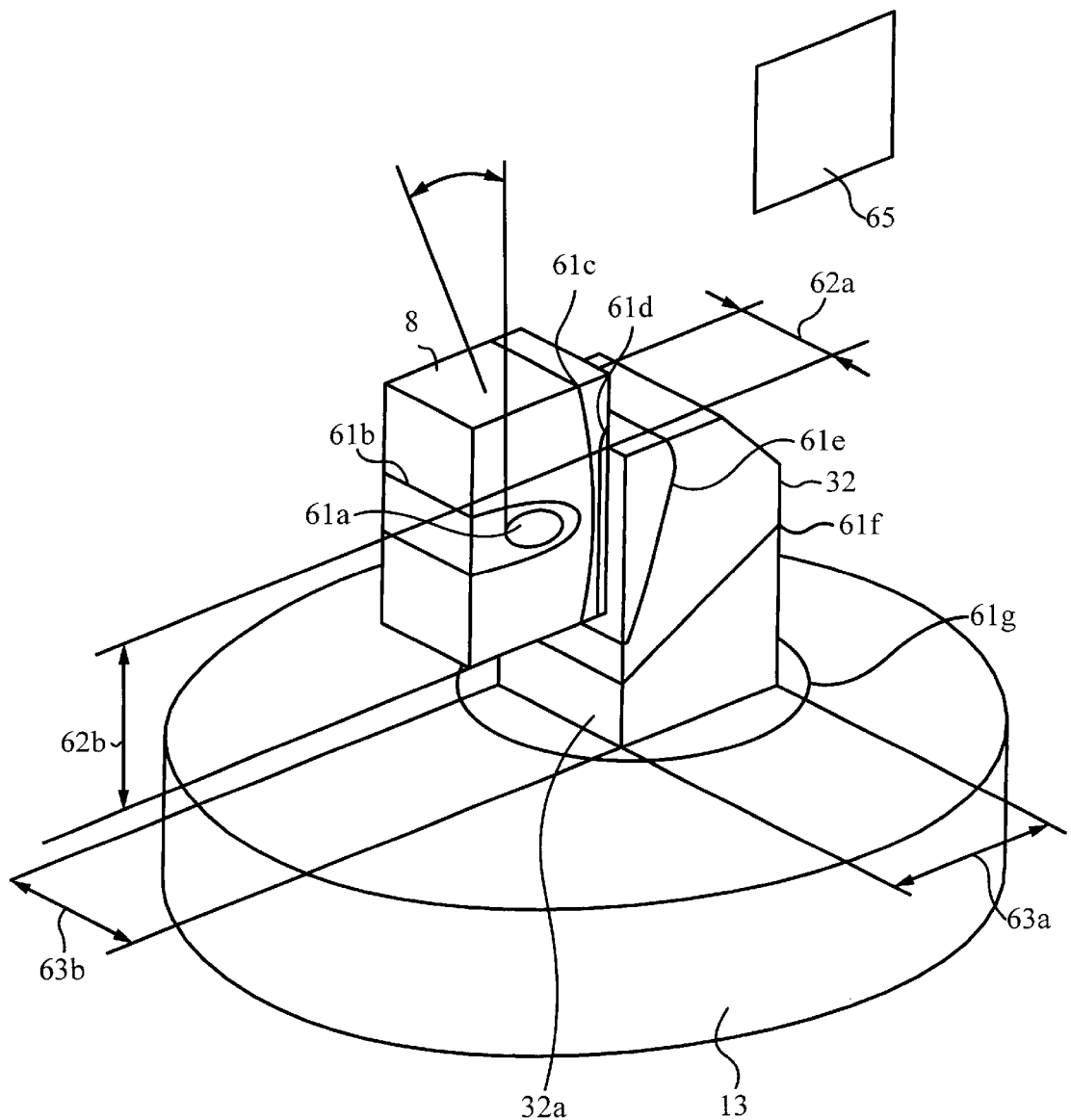
FIG. 6 shows an exemplary perspective view of the thermal flow from the mirror to the sectional portion of the assembly plate.

The width of the first attaching surface corresponds to the first adhesive junction width 62a (see FIG. 6). The height of the first attaching surface corresponds to the first adhesive junction height 62b (see FIG. 6). The width of the fourth attaching surface corresponds to the second adhesive junction width 63b (see FIG. 6). The length of the fourth attaching surface corresponds to the second adhesive junction length 63a (see FIG. 6). The first adhesives 21a has a first uncured cohesive characteristic and a first uncured viscosity. The second adhesives 21b has a second uncured cohesive characteristic and a second uncured viscosity. In the preferred embodiment first and second adhesives 21a and 21b are UV-curing adhesives.

Figure 4:
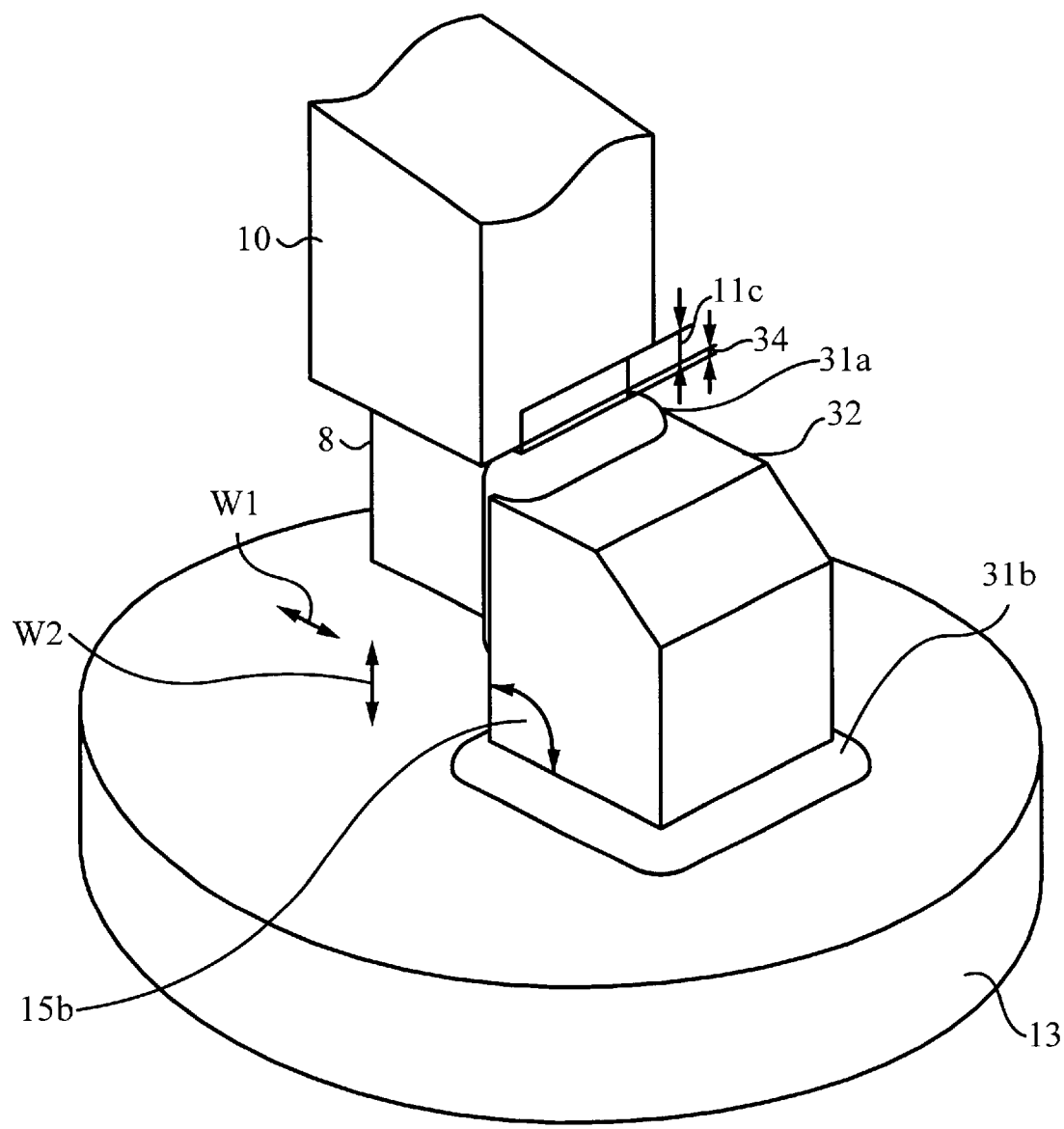
FIG. 4 shows an exemplary perspective view of a side mount being placed between the mirror and the sectional portion of the assembly plate.

FIG. 4 shows the third proceeding step, in which a side mount 32 is brought with a second attaching surface into contact with the first adhesive 21a and with a third attaching surface into contact with the second adhesive 21b. The second attaching surface is a portion of the side mount attachment face 32a (see FIGS. 5, 6 and 7) and corresponds in its shape to the first attaching surface. The third attaching surface is essentially the bottom face (not visible) of the side mount 32 and corresponds to the shape of the fourth attaching surface. The side mount attachment face 32a forms together with the side mount bottom surface the side mount fixation angle 15b.

All attaching surfaces are essentially planar and the aligning fixation angle 15a corresponds to the side mount fixation angle 15b.

First and second attaching surface define the first adhesive junction, third and fourth attaching surface define the second adhesive junction.

It is noted that the first and second adhesives 21a and 21b may be also applied on the second and third attaching surface prior to the third processing step.

During a fourth processing step the vacuum chuck 10 and consequently the mirror 8 are moved back and forth in a first working movement W1, which is essentially perpendicular to the first adhesive junction. The first uncured cohesive characteristic defines together with the areal extension of the first adhesive junction a first cohesive strength. The first cohesive strength is higher than the second viscose resistance, which is defined by the second uncured viscosity and the areal extension of the second adhesive junction. As a result, the side mount 32 moves together with the mirror 8 and the third attaching surface slides along the fourth attaching surface.

The same applies during a back and forth movement in a second working movement W2, which is essentially perpendicular to the second adhesive junction. The combination of first and second working movements W1 and W2 works the first and second adhesives 21a and 21b out of the first and second adhesive junctions. As a result, first and second attaching surfaces as well as third and fourth attaching surfaces come into snug contact with each other. First and second working movements W1 and W2 are induced via the alignment gauge. Because of the predetermined wetting characteristic of at least one attaching surface of the first and second adhesive junction a predetermined adhesive thin film remains in the first and second adhesive junction.

The side mount 32 comes into snug contact in both adhesive junctions mainly without direct manipulation. Hence, the necessity for additional assembly tooling for the side mount 32 is eliminated. Since the side mount 32 does not need extensive access area, space requirements to position and fixate optical elements such as the mirror 8 in a LRA assembly are further reduced.

The removed first and second adhesive 21a and 21b accumulate in the immediate surrounding of the first and second adhesive junction and form a first and second seal ring 31a and 31b.

In a fifth processing step a UV-light is applied to the first and second adhesive junction. First and second adhesive junctions are each from at least one side accessible for the curing UV-light. This is accomplished by providing the assembly plate 13 and/or the side mount 32 from a translucent material.

After the curing process, the vacuum chuck 10 is removed again and the mirror 8 is fixated in its predetermined position and orientation. The misalignment of the mirror 8, which occurs during the curing of the first and second adhesive junction is typically less than 5 μrad. After thermal cycling and long term sitting the misalignment of the mirror 8 remains typically below 10 μrad. This values are exemplary for a mirror 8 and a side mount 32 in the dimensional range between 1.5 mm and 5 mm.

After the curing process, the first and second seal ring 31a and 31b form solid seals that prevent moisture from creeping into the adhesive junctions.

The clamping portion of the mirror 8 is the portion of the mirror 8 that rises above the side mount 32. The clamping portion is high enough, such that a safety chuck distance 34 remains between the lowest extension of the vacuum chuck 10 and the highest extension of the first adhesive seal ring 31. The safety chuck distance 34 prevents the vacuum chuck 10 being accidentally wetted by the first adhesive 21a.

The attaching surfaces undergo a predetermined roughening procedure during the fabrication of the mirror 8 and the side mount 32. The side mount fix angle 15b also needs to be fabricated with a special tolerance. To simplify the detection of the second and third attaching surface, a reference mark in the preferred form of a chamfer 33 is shaped on the edge that diagonally opposes the side mount fix angle 15b. It is appreciated that this reference mark may be any recognizable mark at any location of the side mount 32. It is noted that the mirror 8 may also have a further reference mark to distinguish the first attaching surface.

Figure 5:
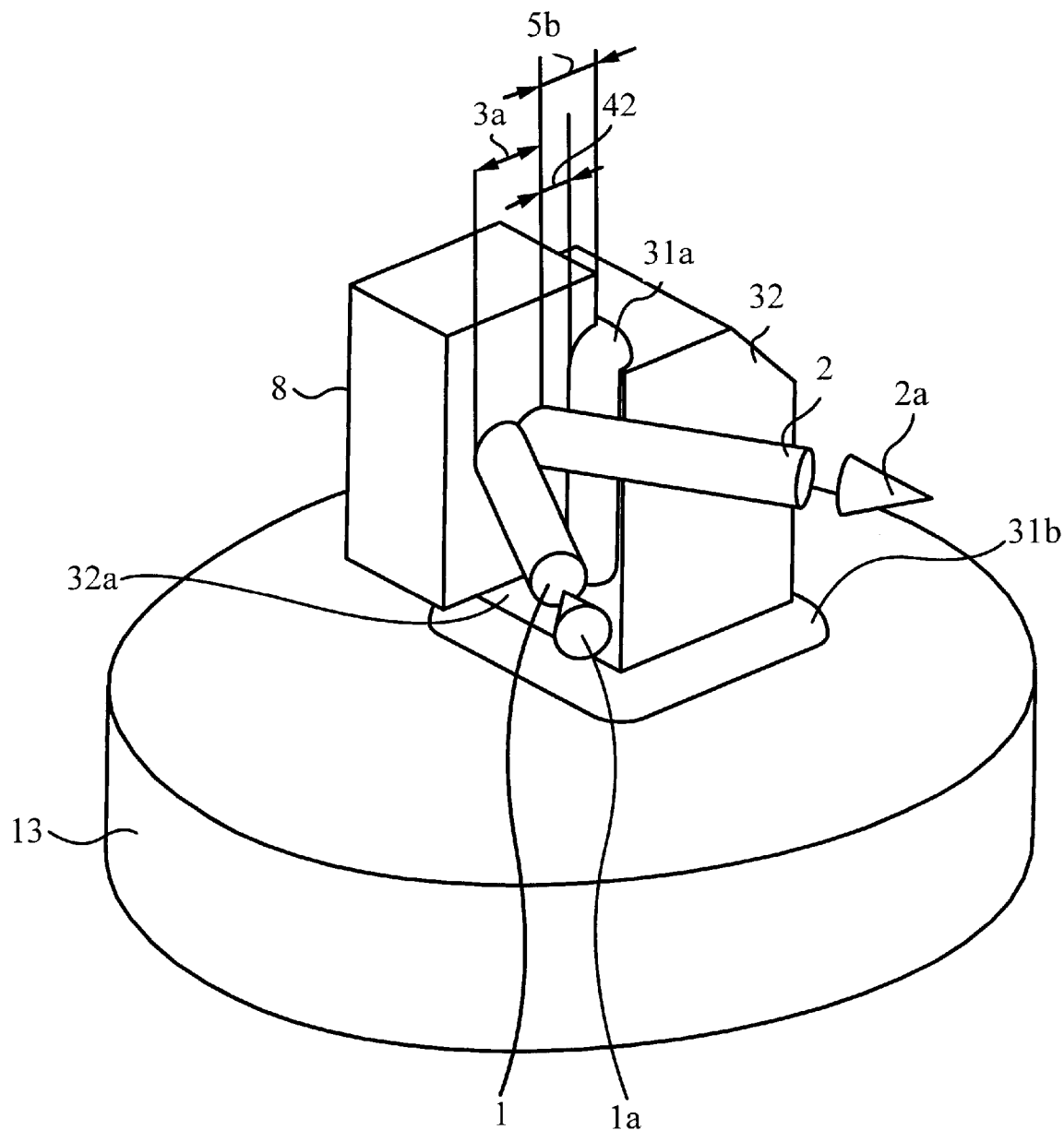
FIG. 5 shows an exemplary perspective view of the operational mirror adhesively fixated on the sectional portion of the assembly plate.

FIG. 5 shows the fixated mirror 8 in operational use as described under FIG. 1. The first adhesive ring 31a is extending with a first seal height 41 into the mirror front face 8a. The second horizontal margin 5b has a dimension such that a laser safety margin 42 is provided between the laser penetration width 3a and the first adhesive seal ring 31a.

First and second adhesive junctions have to provide mechanical connections and thermal bridges. A criterion for the efficiency of an LRA is the laser power, at which it can be operated for a given scale. During each pass of the laser through an optical element like for instance the mirror 8 a certain percentage of the laser energy dissipates inside the translucent structure of the optical element. As a result, the optical element experiences a thermal load that has to be drained. The critical limits are thereby thermal expansion of the mounting structure and critical adhesive temperatures.

The thermal expansion eventually changes the orientation of the optical element. As a result, the properties of the LRA may change during its operation. To minimize this unfavorable effect, it is desirable to fixate optical elements within a LRA in a way such that a thermal rise does not effect the orientation of their optical axes. FIG. 6 shows in that context an exemplary representation of a thermal analysis of the mirror 8 fixated with the side mount 32 on the assembly plate 13. The thermal load is excerpted onto the mirror 8 in its central section where the laser 1 and the emitting laser 2 pass through the translucent structure of the mirror 8. The isothermal lines 61$a$–$g$ visualize exemplary the temperature distribution between the source location and the drain location of the thermal load. It is shown, that the temperature declines in an essentially rotational direction through the side mount 32. This is indicated by a close distance of the isothermal lines 61$e$ and 61$f$ at the side mount attachment face 32$a$. The distance between the isothermal lines 61$e$ and 61$f$ increases the further they are away from the side mount attachment face 32$a$.

The design and placement of the mirror 8 and the side mount 32 is symmetric relative to the mirror plane visualized by the second plane symbol 65. Since the thermal load is excerpted evenly along the mirror thickness 6, the thermal expansion movement remains essentially within the mirror plane. As a result, thermal expansion eventually dislocates the optical axis 8$d$ and/or rotates the optical axis 8$d$ around itself without essentially changing the orientation of the optical axis.

It is noted that the thermal load may be excerpted unevenly on the optical element.

The side mount 32 is made for instance from sapphire, Pyrex or diamond. Materials with their different thermal conductivity are chosen for controlling the flow of thermal energy towards and/or away from the optical element such that the optical element remains within a predetermined temperature range. Materials for the side mount 32 are also chosen in respect to their specific thermal expansion.

The first and second junction have an areal extension such that they provide a required thermal bridging conductivity and consequently a maximal junction temperature for a given thermal load.

The first and second adhesive 21$a$ and 21$b$ have a critical peak temperature, at which their adhesive strength declines below a required minimum. The first and second adhesive 21$a$ and 21$b$ have a critical sustain temperature at which their physical properties are changing over a predetermined time period. The maximal junction temperature has to remain below the critical peak temperature and below the critical sustain temperature.

Figure 7:
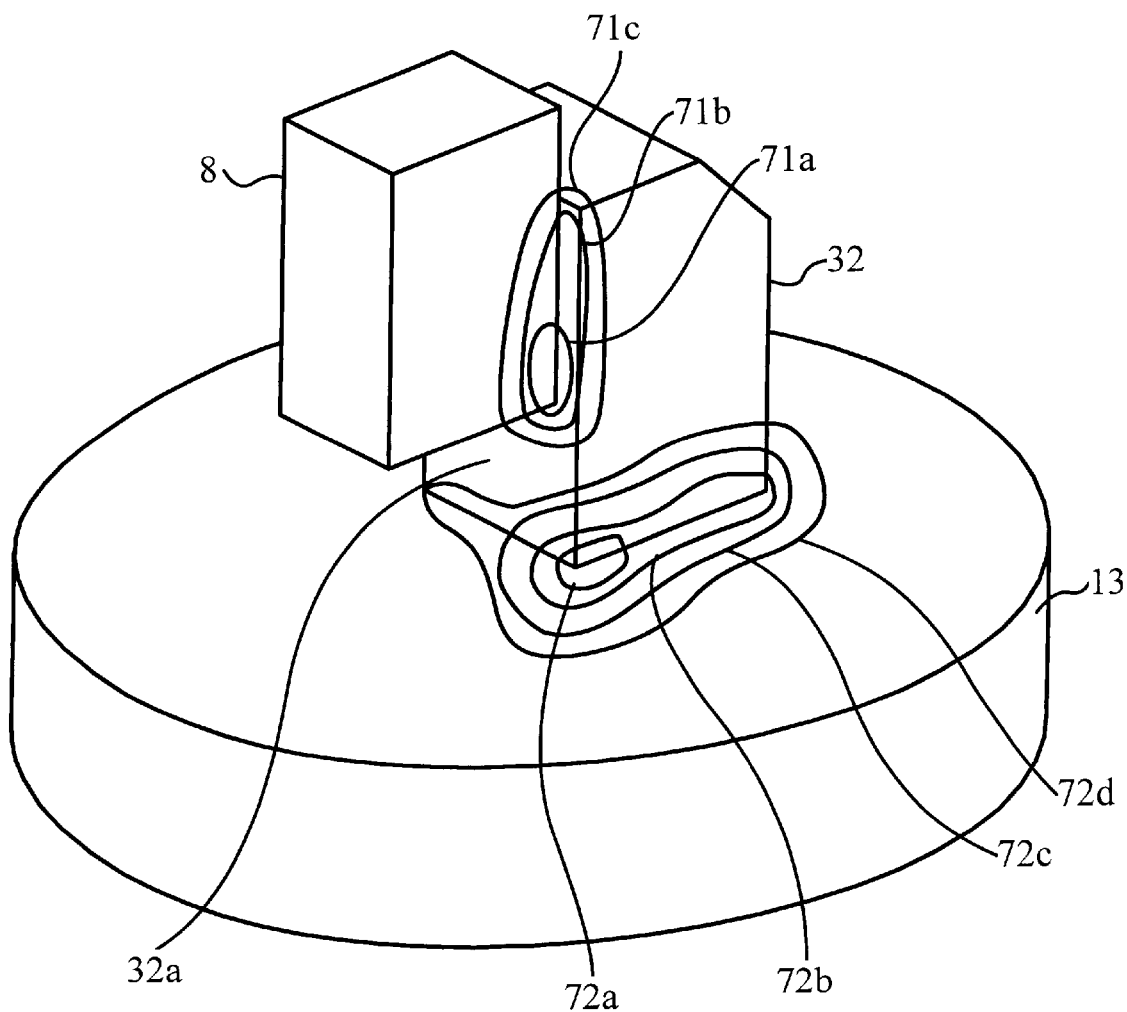
FIG. 7 shows an exemplary perspective view of the mechanical stress areas occurring during a gravitational load like for instance during an peripheral impact or vibrations.

Mechanical strength is a further requirement for the fixation of optical elements in a LRA. The LRA must be able to withstand vibrations and peripheral impacts as they occur during shipping or accidental mishandling. FIG. 7 shows in that context an exemplary visualization of a stress analysis performed under the assumption of a lateral gravitational load on the mirror 8 and the side mount 32. The stress boundaries 71$a$–$c$ and 72$a$–$d$ show the areas of approximately equal stress. The most inner stress boundaries 71$a$ and 72$a$ mark the areas with the maximal stress. As the analysis shows, the peak stress occurs in the corner region of the first and second adhesive junction. First and second adhesive junctions are of an areal extension with respect to the adhesive strength of first and second adhesive 21$a$ and 21$b$ such that the peak stress remains below a predetermined maximum.

During a final mechanical test procedure a static test load is applied in a varying direction onto the clamp portion of the mirror 8. The static test load is preferably applied parallel to the optical plane. For the exemplary size of the mirror 8 and the side mount 32 in the range between 1.5 mm and 5 mm the static test load may be 250 grams.

Due to the high degree of freedom in the positioning of the optical element the manufacturing tolerances of the mirror 8 is mainly reduced to meet the optical demands. The manufacturing tolerances for the side mount 32 are reduced to the angular precision of the side mount fix angle 15$b$. Surfaces tolerances apply to planarity and roughness for the attaching surfaces.

It is noted, that optical elements may be optical, opto-mechanical and electro-optical components like for instance mirrors, lenses, prisms, sensors, wave plates, optical diodes, beam dumps, gain media, modulators, shutters, diode lenses, optical filters>>. It is further noted that the present invention may be applied to optical device other than LRA like for instance Accordingly, the scope of the invention should be determined by the following claims and their legal equivalents.

What is claimed is:

1. An optical device consisting of an optical element and a side mount, said optical element including:
   a) a holding portion for attaching said optical element on an aligning chuck;
   b) a first attaching surface; and
   wherein said optical element is adjustable with five degrees of freedom and said optical element is adhesively fixated by said side mount onto a base plate.

2. The optical device of claim 1, wherein said optical element is selected from the group including mirrors, lenses, prisms, optical filters, wave plates, linear crystals, non linear crystals, optical diodes, sensors, pinholes, beam dumps, gain media, modulators, passive filters, active filters, polarizers, shutters, reticles, diode lenses, diode lasers and any combination of the above.

3. The optical device of claim 1, wherein said side mount is made from the selected group of materials including sapphire, Pyrex and diamond.

4. The optical device of claim 1, wherein said optical element comprises an optical axis.

5. The optical device of claim 4, wherein said optical axis is essentially parallel to an optical plane of an optical assembly.

6. The optical device of claim 1, wherein said side mount includes a second attaching surface and a third attaching surface and said base plate includes a fourth attaching surface.

7. The optical device of claim 6, wherein said second attaching surface is adhesively attached to said first attaching surface.

8. The optical device of claim 6, wherein said third attaching surface is adhesively attached to said fourth attaching surface.

9. The optical device of claim 6, wherein said first attaching surface has a first wetting characteristic, wherein said second attaching surface has a second wetting characteristic, wherein said third attaching surface has a third wetting characteristic, and wherein said fourth attaching surface has a fourth wetting characteristic.

10. The optical device of claim 6, wherein said first attaching surface is essentially parallel to said optical axis.

11. The optical device of claim 6, wherein said first attaching surface and said second attaching surface are contacting in a first adhesive junction with a first adhesive having:

a) a first uncured viscosity;
   b) a first uncured cohesion characteristic;
   c) a first cured adhesive strength;
   d) a first critical temperature; and
   wherein said third attaching surface and said fourth attaching surface are contacting in a second adhesive junction with a second adhesive having:
      a) a second uncured viscosity;
      b) a second uncured cohesion characteristic;
      c) a second cured adhesive strength;
      d) a second critical temperature.

12. The optical device of claim 11, wherein said first adhesive is a first radiation curing adhesive.

13. The optical device of claim 12, wherein said first radiation curing adhesive is a first UV-curing adhesive.

14. The optical device of claim 11, wherein said first adhesive is a first heat curing adhesive.

15. The optical device of claim 11, wherein said second adhesive is a second radiation curing adhesive.

16. The optical device of claim 15, wherein said second radiation curing adhesive is a second UV-curing adhesive.

17. The optical device of claim 11, wherein said second adhesive is a second heat curing adhesive.

18. The optical device of claim 11, wherein said first adhesive junction together with said first uncured viscosity is in a predetermined proportion to said second adhesive junction together with said second uncured viscosity.

19. The optical device of claim 11, wherein said first adhesive junction together with said first uncured cohesions characteristic is in a predetermined proportion to said second adhesive junction together with said second uncured cohesions characteristic.

20. The optical device of claim 11, wherein said first adhesive junction together with said first cured adhesive strength is in a predetermined proportion to said second adhesive junction together with said second cured adhesive strength.

21. The optical device of claim 11, wherein said first adhesive junction is accessible for a curing radiation.

22. The optical device of claim 11, wherein said second adhesive junction is accessible for a curing radiation.

23. The optical device of claim 11, wherein said first adhesive and said second adhesive are identical.

24. The optical device of claim 11, wherein said first adhesive junction has a first thermal conductivity, said side mount has a second thermal conductivity and said second adhesive junction has a third thermal conductivity.

25. The optical device of claim 24, wherein said first thermal conductivity is transmitting a first thermal energy imposed on said optical element such that said first adhesive junction remains below said first critical temperature.

26. The optical device of claim 24, wherein said second thermal conductivity is transmitting a second thermal energy imposed on said side mount such that said second adhesive junction remains below said second critical temperature.

27. The optical device of claim 24, wherein said first thermal conductivity, said second thermal conductivity and said third thermal conductivity transmit a third thermal energy in direction away from said optical element such that said optical element remains within a predetermined temperature range.

28. The optical device of claim 24, wherein said first thermal conductivity, said second thermal conductivity and said third thermal conductivity transmit a third thermal energy in direction towards said optical element such that said optical element remains within a predetermined temperature range.

29. The optical device of claim 1, wherein said side mount has a reference mark.

30. The optical device of claim 29, wherein said reference mark is a chamfer.

31. A method for positioning an optical element and fixating said optical element onto a base plate, said method comprising the following steps of:
   a) holding said optical element in an aligning chuck;
   b) bringing said aligning chuck and said optical element into a predetermined position and orientation, whereby a first attaching surface of said optical element remains in a predetermined orientation with respect to a fourth attaching surface of said base plate;
   c) contacting a side mount with said optical element and with said base plate, whereby:
      I. said side mount has a second attaching surface and a third attaching surface;
      II. said first attaching surface and said second attaching surface essentially correspond in position and orientation;
      III. said third attaching surface and said fourth attaching surface essentially correspond in position and orientation;
      IV. a first adhesive is applied between said first attaching surface and said second attaching surface;
      V. a second adhesive is applied between said third attaching surface and said fourth attaching surface;
   d) curing said first adhesive and said second adhesive; and
   e) removing said aligning chuck.

32. The method of claim 31 whereby said aligning chuck holds said optical element with a vacuum.

33. A method for positioning an optical element and fixating said optical element onto a base plate, said method comprising the following steps of:
   a) holding said optical element in an aligning chuck;
   b) bringing said aligning chuck and said optical element into a predetermined position and orientation, whereby a first attaching surface of said optical element remains in a predetermined orientation with respect to a fourth attaching surface of said base plate;
   c) contacting a side mount with said optical element and with said base plate, whereby:
      I. said side mount has a second attaching surface and a third attaching surface;
      II. said first attaching surface and said second attaching surface essentially correspond in position and orientation;
      III. said third attaching surface and said fourth attaching surface essentially correspond in position and orientation;
      IV. a first adhesive is applied between said first attaching surface and said second attaching surface;
      V. a second adhesive is applied between said third attaching surface and said fourth attaching surface;
   d) working said first adhesive out of a first gap between said first adhesive surface and said second adhesive surface;
   e) working said second adhesive out of a second gap between said third adhesive surface and said second adhesive surface;
   f) curing said first adhesive and said second adhesive; and
   g) removing said aligning chuck.

34. The method of claim 33, whereby said aligning chuck holds said optical element with a vacuum.

35. An optical device consisting of an optical element and a side mount, wherein:
   a. said optical element being essentially rectangular in view of an optical axis of said optical element;
   b. said side mount being essentially rectangular in view of said optical axis;

c. said optical element being attached on said side mount lateral to said optical axis;

d. an upper portion of said optical element raising above said side mount;

e. said side mount being attached with its bottom side on an assembly plate; and f. said side mount having a chamfer between a side mount top face and a side mound side face, said side mount side face being in opposing position to said optical element.

* * * * *